(12) United States Patent
Chang et al.

(10) Patent No.: US 11,914,436 B2
(45) Date of Patent: Feb. 27, 2024

(54) COOLING FAN AND NOISE SENSOR

(71) Applicant: Hewlett-Packard Development Company, L.P., Spring, TX (US)

(72) Inventors: Hung-Wen Chang, Taipei (TW); Ai-Tsung Li, Taipei (TW); Shih-Han Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 154 days.

(21) Appl. No.: 17/419,801

(22) PCT Filed: Sep. 4, 2019

(86) PCT No.: PCT/US2019/049430
§ 371 (c)(1),
(2) Date: Jun. 30, 2021

(87) PCT Pub. No.: WO2021/045735
PCT Pub. Date: Mar. 11, 2021

(65) Prior Publication Data
US 2022/0187882 A1    Jun. 16, 2022

(51) Int. Cl.
*G06F 1/20* (2006.01)

(52) U.S. Cl.
CPC ...... *G06F 1/20* (2013.01); *G05B 2219/49216* (2013.01)

(58) Field of Classification Search
CPC ........ G06F 1/20; G06F 1/1605; G06F 1/1632; G06F 1/1684; G06F 1/203; G06F 1/206; G06F 1/1601; G05B 2219/49216
USPC .......................................................... 700/300
See application file for complete search history.

(56) References Cited

U.S. PATENT DOCUMENTS

| | | | |
|---|---|---|---|
| 6,360,185 B1 | 3/2002 | Futawatari | |
| 7,401,519 B2 | 7/2008 | Kardous | |
| 7,941,231 B1 | 5/2011 | Dunn | |
| 10,061,332 B2 | 8/2018 | North et al. | |
| 2007/0027580 A1 | 2/2007 | Ligtenberg et al. | |
| 2009/0002939 A1* | 1/2009 | Baugh | G06F 1/206 361/679.48 |
| 2016/0013745 A1 | 1/2016 | North et al. | |
| 2016/0171967 A1 | 6/2016 | Giaimo, III et al. | |
| 2017/0219240 A1 | 8/2017 | Cassini et al. | |
| 2020/0126410 A1* | 4/2020 | Voncken | G01C 21/3492 |

FOREIGN PATENT DOCUMENTS

| | | |
|---|---|---|
| CN | 109779939 A | 5/2019 |
| EP | 2068609 A2 | 6/2009 |
| WO | 2005/008194 A2 | 1/2005 |

* cited by examiner

*Primary Examiner* — Michael J Brown
(74) *Attorney, Agent, or Firm* — Knobbe, Martens, Olson & Bear, LLP (57) ABSTRACT

An example system can include a noise sensor communicatively coupled to a controller of a computing device to dynamically determine a sound pressure level (SPL) of an environment in which the computing device is present. The computing device can include a cooling fan and the controller comprising a processor in communication with a memory resource including instructions executable to dynamically determine a threshold speed of the cooling fan based on the determined SPL of the environment set a speed of the cooling fan based on the determined threshold speed.

13 Claims, 6 Drawing Sheets

Fig. 6 and a non-transitory machine-readable medium (MRM);
COOLING FAN AND NOISE SENSOR

BACKGROUND

A computing device cooling fan is a fan inside or attached to a computing device used for cooling a particular component. For instance, fans can be used to draw cooler air into a computing device case, expel warm air from inside, and cool the particular component.

DETAILED DESCRIPTION

As processors, graphics cards, random-access memory (RAM) and other components in computing devices have increased in speed and power consumption, the amount of heat produced by these components has also increased. These components are kept within a specified temperature range to prevent overheating, instability, malfunction, and damage leading to a shortened component lifespan. While it may be possible in computing devices to cool some components using natural convection (e.g., passive cooling), an increasing number of components have improved performance with active cooling. To cool these components, fans are used to move heated air away from the components and draw cooler air over them. The fans may have different speed levels, with the noise produced by the fan increasing as the speed level increases. As used herein, a computing device can be a mechanical or electrical device that transmits or modifies energy to perform or assist in the performance of human tasks. Examples include thin clients, personal computers, printing devices, laptops, tablets, smartphones, mobile devices, and gaming consoles, among others.

Some approaches to component cooling using fans include the use of component temperature readings to control cooling fan speed. In such approaches, the temperature of a particular component of the computing device is determined. If the component reaches a threshold heat level, the fan will turn on. In such an example, if a user is in a very quiet room and cooling fan turns on, the noise produced may be disruptive to the user or others and/or embarrassing for a user, reducing a user's satisfaction with the computing device. Other approaches limit a threshold cooling fan speed such that a cooling fan cannot run above a particular speed. This can reduce performance and lifespan of a computing device, as components may run too hot because of limited system airflow.

In some other approaches, an environment noise level is considered and based on the noise level, a cooling fan speed is determined from a preset cooling fan speed table stored in a basic input/output system (BIOS). Examples of the present disclosure use a noise sensor located on a computing device and/or a peripheral device or devices of the computing device to determine an environmental sound pressure level (SPL), set a threshold cooling fan SPL, and allow the fan speed to dynamically change as long as the threshold cooling fan SPL is not met. As used herein, sound pressure (also known as acoustic pressure) is a local pressure deviation from ambient atmospheric pressure caused by a sound wave. An SPL is a logarithmic measure of the effect pressure of a sound relative to a reference value. An SPL can be determined (e.g., measured in decibels (dB)) using a noise sensor (e.g., ambient noise sensor, SPL meter, etc.). Examples of the present disclosure may allow for reduction of a cooling fan speed (and as a result, a reduction in noise output) as a computing device moves from a louder environment to a quieter environment (or as a static environment gets quieter) and vice versa. This can allow for increased user satisfaction with the computing device, while still allowing cooling fan speeds that cool components to a desired level to preserve performance and lifespan of the computing device.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

Figure 1:
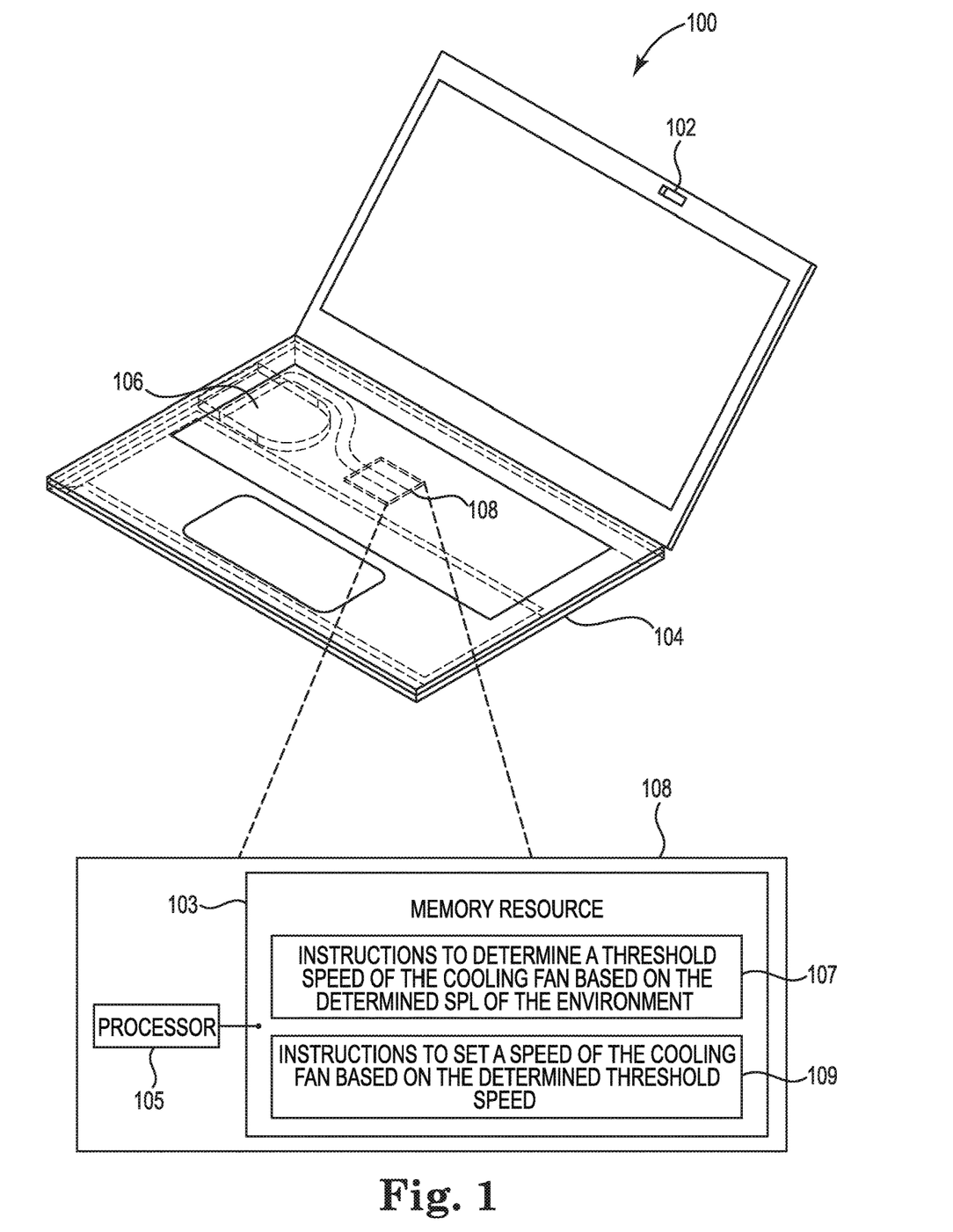
FIG. 1 is a diagram of a system including a cooling fan, a noise sensor, and a controller according to an example.

FIG. 1 is a diagram of a system 100 including a cooling fan 106, a noise sensor 102, and a controller 108 according to an example. System 100 can include the noise sensor 102 located on a computing device 104, The noise sensor 102 can be located on the face of the computing device 104, a laptop in this example, to reduce interference from noise produced by components of the computing device 104. However, a location of the noise sensor 102 on the computing device 104 is not limited to the face to the computing device 104. While one noise sensor 102 is illustrated on the computing device 104, more than one noise sensor may be present on the computing device 104. In such an example, one, some, or all of the noise sensors can determine an SPL of the environment of the computing device 104.

The noise sensor 102 can be communicatively coupled to the controller 108 of the computing device 104 and can dynamically determine an SPL of an environment in which the computing device is present. As used herein, "dynamically" can include variable and/or constantly changing in response to a particular influence (e.g., a change in an SPL of an environment). For instance, the SPL can be determined near-continuously or periodically, among others, and as the SPL of the environment changes (or as the computing device is moved to a different environment with a different SPL), the determinations can be made. As used herein, "near-continuously" includes determining (e.g., measuring, capturing, etc.) without meaningful breaks. "Communicatively coupled," as used herein, can include coupled via various wired and/or wireless connections between devices such that data can be transferred in various directions between the devices. The coupling may not be a direct connection, and in some examples can be an indirect connection.

The computing device 104 can include the cooling fan 106 communicatively coupled to the controller 108. The controller 108, in some examples, can include a combination of hardware and instructions. For instance, the hardware can include the processor 105 and/or the memory resource 103 (e.g., MRM, computer-readable medium (CRM), data store, etc.). The memory resource 103 can include stored instructions, such as instructions 107 and 109.

The processor 105, as used herein, can include a number of processing resources capable of executing instructions 107, 109 stored by the memory resource 103. The instructions (e.g., machine-readable instructions (MRI)) can include instructions stored on the memory resource 103 and executable by the processor 105 to implement a desired function (e.g., dynamically determine a cooling fan speed). The memory resource 103, as used herein, can include a number of memory components capable of storing non-transitory instructions 107, 109 that can be executed by the processor 105. The memory resource 103 can be integrated in a single device or distributed across multiple devices. Further, the memory resource 103 can be fully or partially integrated in the same device as the processor 105 or it can be separate but accessible to that device and processor 105. Thus, it is noted that the controller 108 can be implemented on an electronic device and/or a collection of electronic devices, among other possibilities.

The memory resource 103 can be in communication with the processor 105 via a communication link (e.g., path). The communication link can be local or remote to an electronic device associated with the processor 105. In some examples, the memory resource 103 includes instructions (e.g., software, firmware, etc.) that can be downloaded and stored in a memory resource (e.g., MRM) as well as a hard-wired program (e.g., logic), among other possibilities.

The instructions 107, when executed by a processor such as the processor 105, can include instructions to dynamically determine a threshold speed of the cooling fan 106 based on the determined SPL of the environment. The instructions 109, when executed by a processor such as the processor 105, can dynamically set a speed of the cooling fan 106 based on the determined threshold speed. Put another way, the controller 108 can adjust the threshold speed and the speed of the cooling fan responsive to a change in the SPL.

For instance, a threshold speed can be determined based on a threshold cooling fan speed model (herein after referred to as "model") used to set the threshold speed at a level that outputs noise that is a particular dB level below the determined environmental SPL. The threshold speed, for instance, can include a highest speed the cooling fan is allowed to reach at the determined SPL of the environment. The highest speed, in some examples, can have an A-weighted decibel level (e.g., relative loudness of sounds in air as perceived by the human ear) within a threshold range of an A-weighted decibel level of the SPL of the environment. For example, if the noise sensor 102 determines the SPL is 30 dB, a threshold speed is determined to be a speed that outputs two dB less (e.g., 28 dB) than the SPL. The cooling fan, while in the environment having an SPL of 30, cannot exceed the threshold speed. Because the SPL can be determined dynamically, for instance as the environment noise level changes or the computing device 104 changes environments (e.g., having different noise levels), updated SPL determinations can be made, and as a result, updated threshold cooling fan speeds can be determined and updated speeds set.

For example, when the SPL of the environment increases, the threshold speed is increased, and when the SPL of the environment decreases, the threshold speed is decreased. As a result, a cooling fan can run at higher speeds in a louder environment and lower speeds in a quieter environment. Mile a −2 dB model is used as an example herein, examples of the present disclosure are not limited to a −2 dB model. For instance, the model may be 0 dB, −1 dB, −3 dB, +1 dB, +2 dB, etc.

Figure 2:
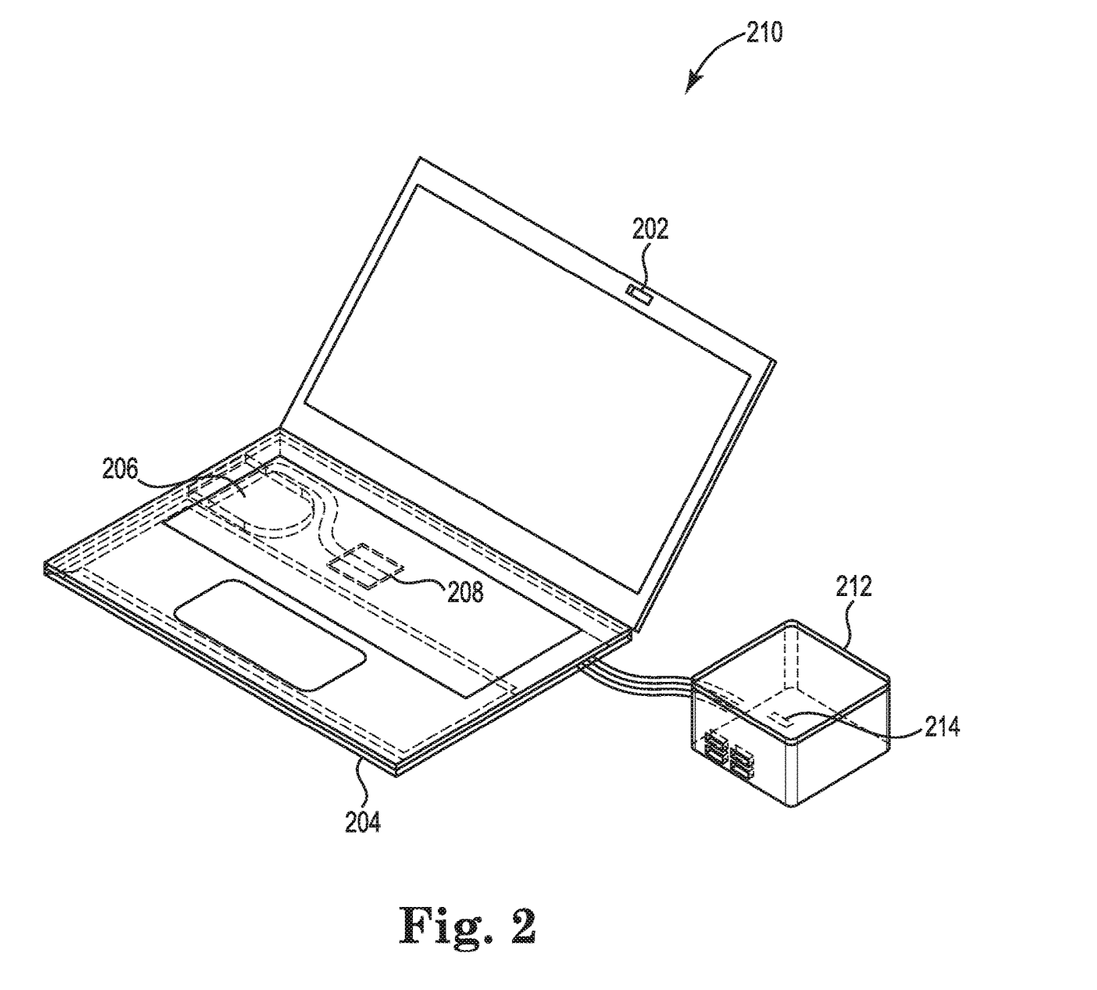
FIG. 2 is a diagram of a system including a noise sensor on a computing device and a noise sensor on a device peripheral to the computing device.

FIG. 2 is a diagram of a system 210 including a noise sensor 202 on a computing device 204 and a noise sensor 214 on a device 212 peripheral to the computing device 204. In some examples of the present disclosure, the SPL determination can be made by a noise sensor 214 located on a device other than the computing device 204 on which the cooling fan 206 resides. For instance, a docking accessory or other peripheral device 212 may include a noise sensor 214. The noise sensor 214 on the peripheral device 212 may reflect more accurately an environmental SPL level as compared to the noise sensor 202 on the computing device 204 since mechanical and electronic noise interference from the computing device 204 may be reduced. While one noise sensor 202 is illustrated on the computing device 204 and one noise sensor 214 is illustrated on the peripheral device 212, more than one noise sensor may be present on the computing device 204 and/or the peripheral device 212. In such an example, one, some, or all of the noise sensors can determine an SPL of the environment of the computing device 204.

In some examples, the noise sensor 214 can be communicatively coupled to the controller 208 and can determine the SPL of the environment. The controller 208 can use the SPL determined by the noise sensor 214 to determine a threshold speed of the cooling fan 206. In some examples, the controller 208 can use the SPL determined by both the noise sensor 202 of the computing device 204 and the noise sensor 214 of the peripheral device 212. In some instances, when the peripheral device 212 is detected by the controller 208 as connected, the controller 208 can automatically switch from using SPL determinations made by the noise sensor 202 to SPL determinations made by the noise sensor 214 or by both noise sensors 202 and 214.

Figure 3:
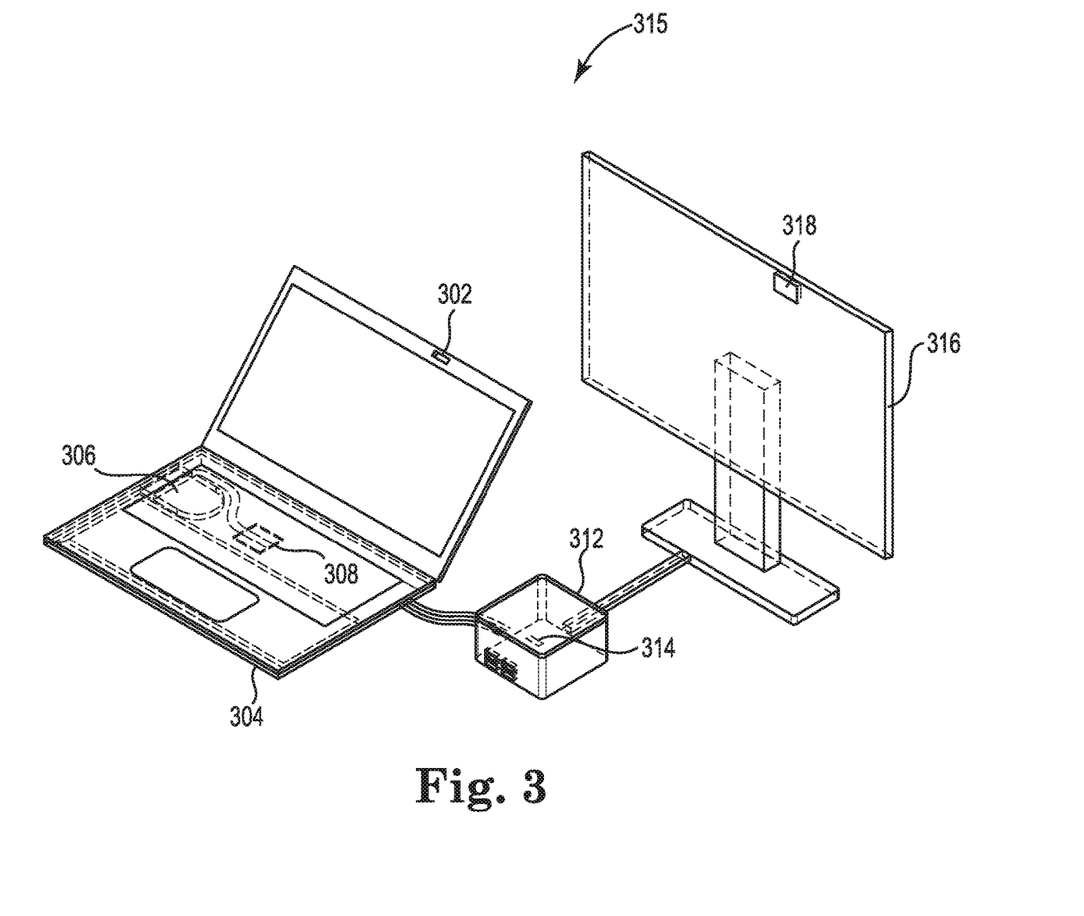
FIG. 3 is a diagram of a system including a noise sensor on a computing device and noise sensors on devices peripheral to the computing device.

FIG. 3 is a diagram of a system 315 including a noise sensor 302 on a computing device 304 and noise sensors 314, 318 on devices 312, 316 peripheral to the computing device 304. In some examples, the SPL determination can be made by the noise sensor 302 on the computing device 304, on one peripheral device 312 or 316 or on a combination thereof. While two peripheral devices (e.g., a docking device and a monitor) are illustrated in FIG. 3, more or fewer peripheral devices may be utilized. The noise sensors 302, 314, and 318 can be communicatively coupled to the controller 308. While one noise sensor 302 is illustrated on the computing device 304 and one noise sensor 314, 318 is illustrated on each of the respective peripheral devices 312, 316, more than one noise sensor may be present on the computing device 204 and/or the peripheral devices 312, 316. In such an example, one, some, or all of the noise sensors can determine an SPL of the environment of the computing device 304.

In an example in which it is determined that the noise sensor 318 will be used, the controller 308 receives an environmental SPL from the noise sensor 318, a threshold speed of the cooling fan 306 can be determined based on the SPL, and a cooling fan speed can be set (or adjusted if it is already running). Similar processes may be used in examples in which noise sensors 302 or 314 are chosen. In some examples, more than one noise sensor is used in the determination of an environmental SPL. For instance, the noise sensors 314 and 318 on the peripheral devices 312 and 316, respectively may be used in combination. For example, an average, median, or other combination of the determined SPLs from the noise sensors 314 and 318 may be used to determine a threshold cooling fan speed. In another example, a combination of the noise sensors 302, 314, and/or 318 may be used. Other combinations may be used, and examples are not so limited.

In some instances, when a peripheral device such as docking device 312 or monitor 316 is detected by the controller 308 as connected, the controller 308 can automatically switch from using SPL determinations made by the noise sensor 302 to SPL determinations made by the noise sensor 314, the noise sensor 318 or by some combination of noise sensors 302, 314, and 318. A determination of which noise sensor to use can be preconfigured, for instance, based on manufacturer settings, administrator settings (e.g., in an office setting), or user settings, among others.

Figure 4:
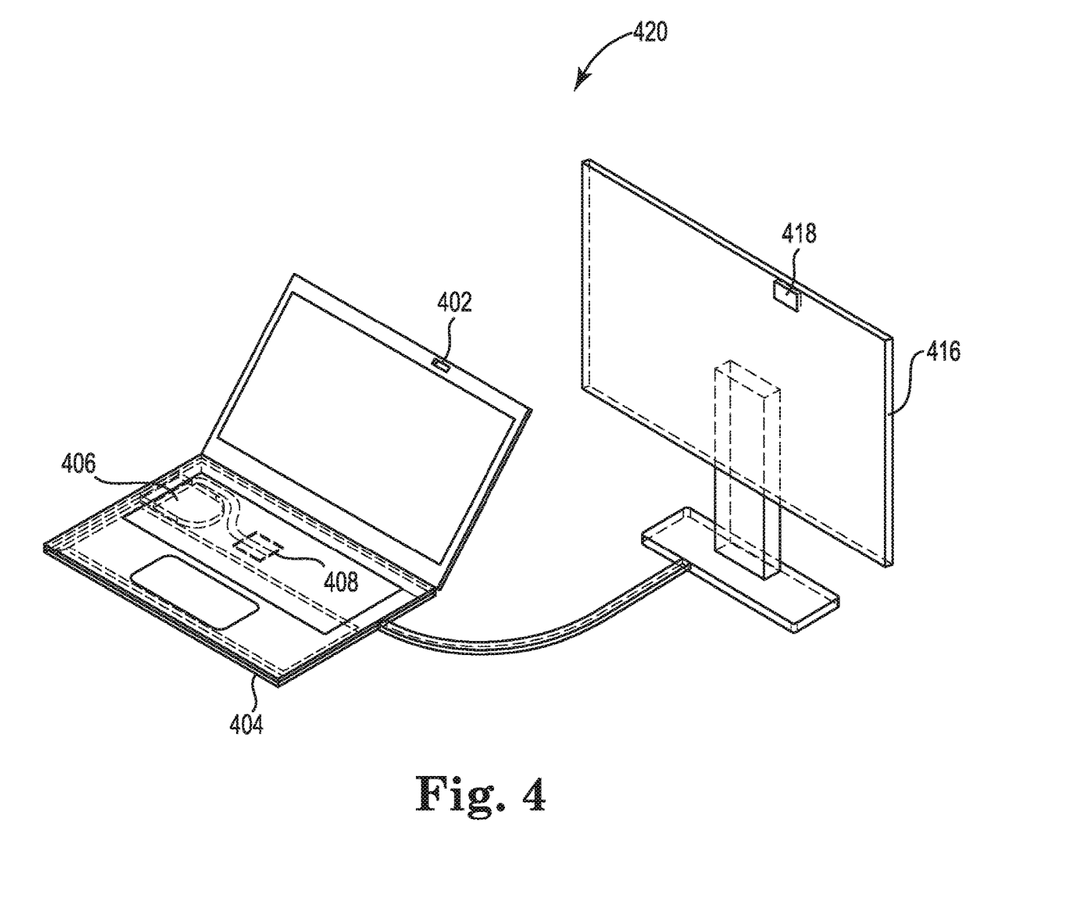
FIG. 4 is another diagram of a system including a noise sensor on a computing device and a noise sensor on a device peripheral to the computing device.

FIG. 4 is another diagram of a system 420 including a noise sensor 402 on a computing device 404 and a noise sensor 418 on a device 416 peripheral to the computing device 404. In some examples of the present disclosure, the SPL determination can be made by a noise sensor 418 located on a device other than the computing device 404 on which the cooling fan 406 resides. For instance, a peripheral device 416 (e.g., a monitor) may include a noise sensor 418. The noise sensor 418 on the peripheral device 416 may reflect more accurately an environmental SPL level as compared to the noise sensor 402 on the computing device 404 since mechanical and electronic noise interference from the computing device 404 may be reduced. While one noise sensor 402 is illustrated on the computing device 404 and one noise sensor 418 is illustrated on the peripheral device 416, more than one noise sensor may be present on the computing device 404 and/or the peripheral device 416. In such an example, one, some, or all of the noise sensors can determine an SPL of the environment of the computing device 404.

In some examples, the noise sensor 418 can be communicatively coupled to the controller 408 and can determine the SPL of the environment. The controller 408 can use the SPL determined by the noise sensor 418 to determine a threshold speed of the cooling fan 406. In some examples, the controller 408 can use the SPL determined by both the noise sensor 402 of the computing device 404 and the noise sensor 418 of the peripheral device 412. In some instances, when the peripheral device 412 is detected by the controller 408 as connected, the controller 408 can automatically switch from using SPL determinations made by the noise sensor 402 to SPL determinations made by the noise sensor 418 or by both noise sensors 402 and 418.

Figure 5:
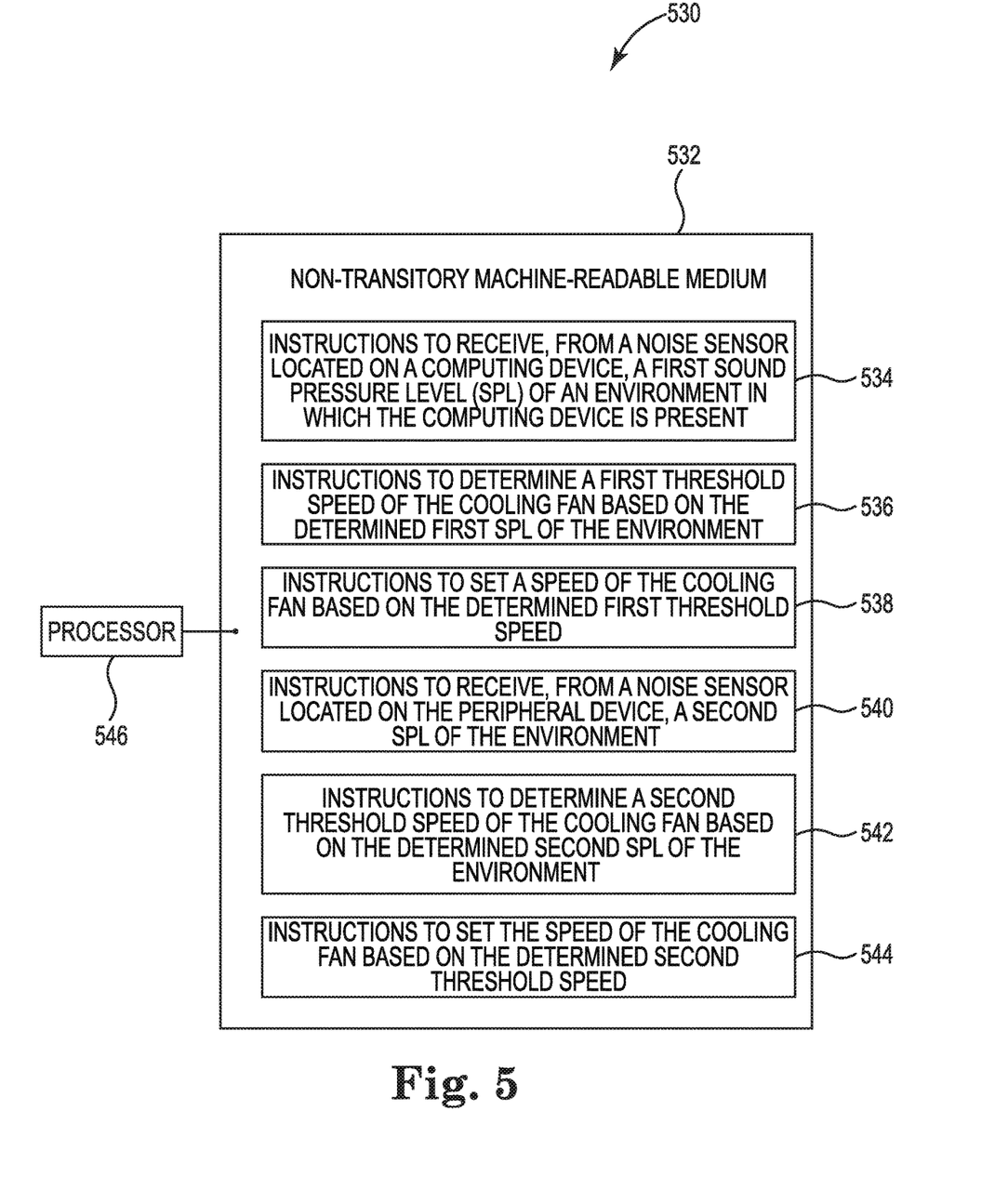
FIG. 5 is a diagram of a controller including a processor and a non-transitory machine-readable medium (MRM)

FIG. 5 is a diagram of a controller 530 including a processor 546 and a non-transitory MRM 532. In some examples, controller 530 may be any of controllers 108, 208, 308, 408, as illustrated in FIGS. 1-4. The controller 530 can include the non-transitory MRM 532 on which may be stored instructions, such as instructions 534, 536, 538, 540, 542, 544. Although the following descriptions refer to a processor and a memory resource, the descriptions may also apply to a system with multiple processors and multiple memory resources. In such examples, the instructions may be distributed (e.g., stored) across multiple non-transitory MRMs and the instructions may be distributed (e.g., executed by) across multiple processors.

The non-transitory MRM 532 may be electronic, magnetic, optical, or other physical storage device that stores executable instructions. Thus, non-transitory MRM 532 may be, for example, Random Access Memory (RAM), an Electrically-Erasable Programmable ROM (EEPROM), a storage drive, an optical disc, and the like. In this example, the executable instructions 534, 536, 538, 540, 542, 544 can be "installed" on the device. Additionally and/or alternatively, the non-transitory MRM 532 can be a portable, external or remote storage medium, for example, that allows the controller 530 to download the instructions 534, 536, 538, 540, 542, 544 from the portable/external/remote storage medium. In this situation, the executable instructions may be part of an "installation package". As described herein, the non-transitory MRM 532 can be encoded with executable instructions for dynamically adjusting a cooling fan speed based on an SPL of an environment.

The instructions 534, when executed by a processor such as the processor 546, can include instructions to receive, from a noise sensor located on a computing device, a first SPL of an environment in which the computing device is present. The noise sensor can determine the SPL and send the determination to the controller 530, for instance. The instructions 536, when executed by a processor such as the processor 546, can include instructions to determine a first threshold speed of the cooling fan based on the determined first SPL of the environment, and the instructions 538, when executed by a processor such as the processor 546, can include instructions to set a speed of the cooling fan based on the determined first threshold speed. For instance, a model can be used that takes the noise sensor reading as input and determines the first threshold speed (e.g., limits the cooling fan speed) For example, the model may be set such that when the first SPL is less than 25 dB, the cooling fan may spin at a speed that produces a 25 dB of noise, which is 2 dB higher than surrounding environmental noise. Other models or ranges may be used.

In some examples, a peripheral device such as a docking device (e.g., docking station) or monitor can be coupled to the computing device. In such an example, the instructions 540, when executed by a processor such as the processor 546, can include instructions to receive, from a noise sensor located on the peripheral device, a second SPL of the environment. The second SPL may be different for instance than the first SPL because of mechanical or electrical noise interference present near one of the noise sensors (e.g., component noise near the first noise sensor). In some examples, when the computing device housing the cooling fan detects connection of a peripheral device having a noise sensor, SPL determinations are automatically moved to a noise sensor on the peripheral device. In some instances, the switch may be done manually, and/or both noise sensors can be used.

The instructions 542, when executed by a processor such as the processor 546, can include instructions to determine a second threshold speed of the cooling fan based on the determined second SPL of the environment, and the instructions 544, when executed by a processor such as the processor 546, can include instructions to set the speed of the cooling fan based on the determined second threshold speed. A same or different model than the model used with the first SPL determination can be used. In some examples, the speed of the cooling fan can be set based on the determined first threshold speed and the determined second threshold speed. For instance, both noise sensor SPL determinations can be used in determining an appropriate cooling fan speed. While two devices, including a computing device and a peripheral device are described herein, more devices may house noise sensors for use in determining cooling fan speeds. Additionally or alternatively, more than one noise sensor may be present on a device.

In some examples, the MRM 532 can include instructions to determine a third threshold speed of the cooling fan responsive to a change in the second SPL of the environment based on the changed second SPL and set a new speed of the cooling fan based on the determined third threshold speed. For instance, if the environment gets louder or quieter, a new cooling fan speed can be determined. This can continue iteratively, such that the SPL is near-continuously determined, and as a result so are the threshold cooling fan speed and the cooling fan speed. Put another way, the new speed of the cooling fan can be set dynamically such that the new speed of the cooling fan changes in response to changes in the determined second SPL and the determined third threshold speed.

Figure 6:
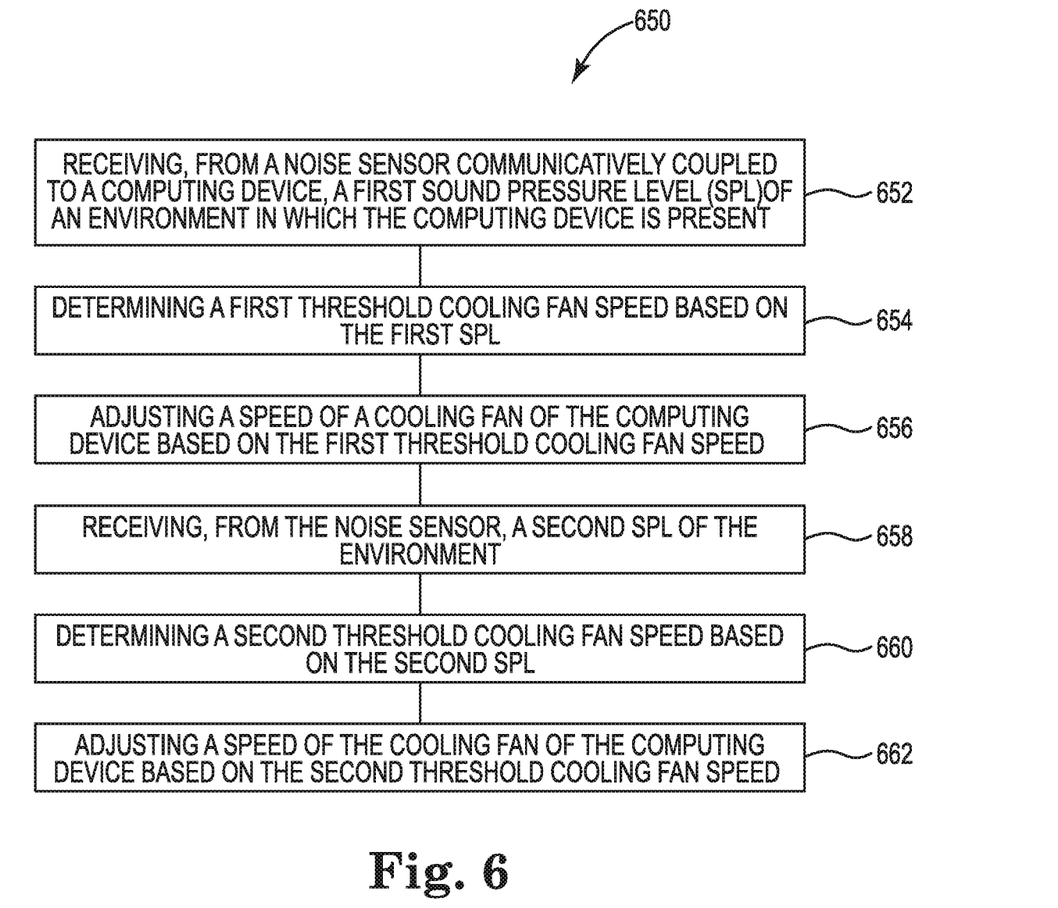
FIG. 6 is a method for setting a cooling fan speed using a noise sensor according to an example.

FIG. 6 is a method 650 for setting a cooling fan speed using a noise sensor according to an example. The method 650 may be performed by a system 100, 210, 315, 420 and/or controllers 108, 208, 308, 408, 530 as described with respect to FIGS. 1-5. At 652, the method 650 includes receiving, from a noise sensor communicatively coupled to a computing device, a first SPL of an environment in which the computing device is present, and at 654, the method 650 includes determining a first threshold cooling fan speed based on the first SPL. For instance, a controller can receive from the noise sensor, which may have an adjustable location, the first SPL. The controller may use a thermal table built into a BIOS of the computing device, for instance, that includes different cooling fan speeds and their associated dB levels. Using the thermal table and a predefined model, the first threshold cooling fan speed is determined, and at 656, the method 650 includes adjusting a speed of a cooling fan of the computing device based on the first threshold cooling fan speed. For instance, in the thermal table there may be a plurality of fan speeds and their corresponding decibel level. Those fan speed rotations per minute (RPMs) can be preset into the BIOS, and the cooling fan operates between those preset cooling fan RPMs. For example, the thermal table may have entries of 2000 RPM, 3000 RPM, and 4000 RPM, and those three RPMs may be preset into the BIOS. In some examples, the noise sensor reading may determine the cooling fan can spin at all three speeds, or it may operate between 2000 RPM and 3000 RPM, for instance.

The method 650, at 658, includes receiving, from the noise sensor, a second SPL different than the first SPL of the environment. For instance, if the environment gets louder or quieter, or if the computing device is moved to a different location having a different SPL, a different SPL is determined. For instance, the noise sensor can monitor in real time, such that changes in the SPL can be dynamically reported to the controller, for instance. At 660, the method 650 includes determining a second threshold cooling fan speed based on the second SPL. Because of the change in the SPL, the threshold cooling fan speed may change. If the SPL change is small, the threshold cooling fan speed may not change. For instance, if the SPL fell one dB, the threshold cooling fan speed may remain the same (e.g., in a +2 dB model), but if the SPL rose 5 dB, the threshold cooling fan speed may change.

The method 650, at 662, includes adjusting a speed of the cooling fan of the computing device based on the second threshold cooling fan speed. For instance, as the SPL increases, the threshold cooling fan speed increases, and as a result the cooling fan speed can be set at a higher level (and vice versa for decreased SPL). Put another way, the speed of the cooling fan can be increased when the second threshold cooling fan speed is greater than the first SPL, and the speed of the cooling fan can be decreased with the second threshold cooling fan speed is less than the first SPL.

In some examples, the threshold cooling fan speed may increase, but the fan speed may not be set to the highest speed. For instance, if computing device components are at an appropriate temperature, in a loud room, the fan speed may remain at a lower level.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure,

What is claimed is:

1. A system, comprising:
   a first noise sensor located on a computing device and communicatively coupled to a controller of the computing device; and
   the computing device, comprising:
      a cooling fan; and
      the controller comprising a processor in communication with a memory resource including instructions executable to dynamically:
         determine, using inputs from a combination of noise sensors including the first noise sensor, a sound pressure level (SPL) of an environment;
         determine a threshold speed of the cooling fan based on the determined SPL of the environment; and
         set a speed of the cooling fan based on the determined threshold speed.

2. The system of claim 1, wherein the controller to dynamically determine the threshold speed and set the speed of the cooling fan comprises the controller to adjust the threshold speed and the speed of the cooling fan responsive to a change in the SPL.

3. The system of claim 1, further comprising the controller to:
   increase the threshold speed responsive to an increase in the SPL of the environment; and
   decrease the threshold speed responsive to a decrease in the SPL of the environment.

4. The system of claim 1, wherein the threshold speed is a highest speed the cooling fan is allowed to reach at the determined SPL of the environment.

5. The system of claim 4, wherein the highest speed has an A-weighted decibel level within a threshold range of an A-weighted decibel level of the SPL of the environment.

6. The system of claim 1, further comprising:
   a second noise sensor from the combination of noise sensors physically located on a device peripheral to the computing device; and
   the controller to:
      determine a threshold speed of the cooling fan based on the SPL of the environment determined by the first noise sensor and an SPL of the environment determined by the second noise sensor.

7. A method, comprising:
   receiving, from a combination of noise sensors including a first noise sensor located on a computing device, a first sound pressure level (SPL) of an environment in which the computing device is present;

determining a first threshold cooling fan speed based on the first SPL;

adjusting a speed of a cooling fan of the computing device based on the first threshold cooling fan speed;

receiving, from the combination of noise sensors, a second SPL of the environment;

determining a second threshold cooling fan speed based on the second SPL; and adjusting a speed of the cooling fan of the computing device based on the second threshold cooling fan speed, wherein the first SPL and the second SPL are different SPLs.

8. The method of claim 7, wherein adjusting the speed of the cooling fan based on the second SPL comprises:

increasing the speed of the cooling fan when the second threshold cooling fan speed is greater than the first SPL; and decreasing the speed of the cooling fan when the second threshold cooling fan speed is less than the first SPL.

9. The method of claim 7, further comprising determining the first and the second threshold cooling fan speeds using a predetermined cooling fan speed model.

10. A controller comprising a processor in communication with a memory resource including instructions executable to:

receive, from a first noise sensor located on a computing device, a first sound pressure level (SPL) of an environment in which the computing device is present;

determine a first threshold speed of a cooling fan based on the determined first SPL of the environment;

set a speed of the cooling fan based on the determined first threshold speed; and responsive to coupling the computing device to a peripheral device of the computing device:

receive, from a second noise sensor located on the peripheral device, a second SPL of the environment;

determine a second threshold speed of the cooling fan based on using inputs from a combination of the determined first SPL of the environment and the determined second SPL of the environment; and set the speed of the cooling fan based on the determined second threshold speed.

11. The controller of claim 10, further comprising the controller to:

responsive to a change in the second SPL of the environment, determine a third threshold speed of the cooling fan based on the changed second SPL of the environment; and set a new speed of the cooling fan based on the determined third threshold speed.

12. The controller of claim 11, further comprising the controller to set the new speed of the cooling fan dynamically such that the new speed of the cooling fan changes in response to changes in the determined second SPL and determined third threshold speed.

13. The controller of claim 10, further comprising the controller to set the speed of the cooling fan based on the determined second threshold speed and the determined first threshold speed.

* * * * *